US007384087B2

(12) United States Patent
Littlejohn

(10) Patent No.: US 7,384,087 B2
(45) Date of Patent: Jun. 10, 2008

(54) COMPUTER MOUNT FOR A MOTORCYCLE AND RELATED METHODS

(76) Inventor: Joseph E. Littlejohn, 1435 Birwood St., Deltona, FL (US) 32725

( * ) Notice: Subject to any disclaimer, the term of this patent is extended or adjusted under 35 U.S.C. 154(b) by 22 days.

(21) Appl. No.: 11/424,960

(22) Filed: Jun. 19, 2006

(65) Prior Publication Data

US 2006/0285286 A1 Dec. 21, 2006

Related U.S. Application Data

(60) Provisional application No. 60/692,454, filed on Jun. 21, 2005.

(51) Int. Cl.
*B60R 9/06* (2006.01)

(52) U.S. Cl. .................. 296/37.1; 108/50.01; 361/683

(58) Field of Classification Search ............... 296/37.1; 108/50.01; 361/683; 206/576
See application file for complete search history.

(56) References Cited

U.S. PATENT DOCUMENTS 5,005,661 A 4/1991 Taylor et al. ............... 180/219
5,212,628 A 5/1993 Bradbury .................... 361/395
5,556,017 A 9/1996 Troy .......................... 224/549
5,590,022 A 12/1996 Harvey ....................... 361/683
5,973,917 A 10/1999 White ........................ 361/683
6,426,869 B1 7/2002 White ........................ 361/683
6,513,689 B2 2/2003 Vincenzo .................... 224/435
7,121,518 B2 * 10/2006 Hovde et al. ............... 248/460
7,215,538 B1 * 5/2007 Chen et al. ................. 361/683
2002/0027767 A1 * 3/2002 Ryder ......................... 361/683
2003/0183669 A1 10/2003 Cameron .................... 224/585
2003/0218113 A1 11/2003 Sullivan ................ 248/346.07
2005/0088812 A1 * 4/2005 Hillman et al. ............. 361/683

OTHER PUBLICATIONS

Penn Computing Magazine, http://web.archive.org/web/20040604160028/http://www.pencomputing.com/features/index_panasonic.htmlarticle entitled "Tough as Nails", Oct. 2002, 11 pages.*

ChannelWeb network, http://www.crn.com/it-channel/18815849,"Mobile PC Pilot Extends the Long Arm of the Law", dated Aug. 31, 2002.*

* cited by examiner

*Primary Examiner*—Dennis H Pedder
(74) *Attorney, Agent, or Firm*—Allen, Dyer, Doppelt, Milbrath & Gilchrist, P.A.

(57) ABSTRACT

A computer mount for a storage box carried by a motorcycle includes a folding arm assembly coupled to the storage box, and a support tray coupled to the folding arm assembly for supporting a computer. The folding arm assembly has a stored position for storing the computer within the storage box, and an extended position for extending the computer away from the storage box.

27 Claims, 10 Drawing Sheets

24
82
54
130
96
98
92
58
56
62
60
70
94
40
32(3)
32(2)
52
62
32(1)
34
130
26

COMPUTER MOUNT FOR A MOTORCYCLE AND RELATED METHODS

RELATED APPLICATION

This application claims the benefit of U.S. Provisional Application Ser. No. 60/692,454 filed Jun. 21, 2005, the entire contents of which are incorporated herein by reference.

FIELD OF THE INVENTION

The present invention relates to the field of motorcycles, and more particularly, to a computer mount for a storage box attached to a motorcycle and related methods.

BACKGROUND OF THE INVENTION

A police motorcyclist typically carries a laptop computer in a storage box attached to their motorcycle. The laptop computer includes a radio card for remotely accessing a police database for performing database searches. Checking a driver license after a motorist has been stopped for a traffic violation is one example of when a database search is performed.

When the laptop computer is removed from the storage box, it is typically balanced on the seat of the motorcycle while the police officer enters data to perform the database search. Many times the laptop computer may not be properly balanced, and as a result, falls to the ground causing damage. This is especially so when the motorcycle is parked on uneven terrain. In addition, the laptop computer is typically not secured when carried in the storage box, and as a result, may be damaged during travel.

One approach for a laptop computer carrying case for a motorcycle rider is disclosed in U.S. Published Patent Application No. 2003/0183669. The carrying case is configured as a backpack to be worn by the motorcyclist. While effective for carrying the laptop computer, problems still exist when the laptop computer is removed from the backpack for use.

A motorcycle storage box is disclosed in U.S. Pat. No. 6,513,689. The '689 patent is directed to a control mechanism which obviates a user's negligence during closing of the storage box. However, no mention is made on how to secure a laptop computer therein.

A carrying case having a moveable support tray for a laptop computer is disclosed U.S. Pat. No. 5,212,628. In the '628 patent, a pair of spaced apart arms is pivotly coupled to a bottom of the carrying case. This allows the support tray to extend outwardly from the carrying case with the laptop computer secured in place. The pair of spaced apart arms allows the support tray to be lifted vertically and advanced horizontally relative to the carrying case when the cover thereof is open. Even though the carrying case is portable, it is not intended to be mounted to a police motorcycle.

SUMMARY OF THE INVENTION

In view of the foregoing background, it is therefore an object of the present invention to reduce the possibility of a laptop computer that is carried in a storage box attached to a police motorcycle from being damaged while in transient and while in use in the field.

This and other objects, features, and advantages in accordance with the present invention are provided by a computer mount for a storage box carried by a motorcycle comprising a folding arm assembly coupled to the storage box, and a support tray coupled to the folding arm assembly for supporting a computer. The folding arm assembly has a stored position for storing the computer within the storage box, and an extended position for extending the computer away from the storage box. The computer may be a laptop computer, for example.

The folding arm assembly may comprise a plurality of arms pivotly coupled together, and the support tray may be pivotly coupled to the folding arm assembly. The folding arm assembly may further comprise at least one tension device for holding the folding arm assembly in the stored or extended position.

The folding arm assembly can be 3 dimensionally positioned. The computer mount may further comprise a rotatable mount coupled between the folding arm assembly and the storage box so that the folding arm assembly is rotatable 360 degrees in a direction parallel to the ground.

The support tray may comprise an adjustable support tray for adjusting to a size of the laptop computer. The adjustable support tray may comprise a pair of spaced apart side rails. At least one of the side rails may be adjustable for adjusting to a length/width of the laptop computer. The adjustable support tray may further comprise a pair of spaced apart corner stops on each side rail for respectively contacting corners of the laptop computer. At least one corner stop on each side rail may be adjustable for adjusting to a width/length of the laptop computer. The adjustable support tray may further comprise at least one L-shaped side clamp on each side rail. Each L-shaped side clamp may be adjustable for adjusting to a height of the laptop computer.

The computer mount may further comprise a resting shelf coupled between the storage box and the folding arm assembly. The resting shelf may comprise a plurality of rest stops for contacting the support tray when the folding arm assembly is in the stored position. The computer mount may further comprise at least one strap coupled between the resting shelf and the computer for maintaining contact between the support tray and the plurality of rest stops when the folding arm assembly is in the stored position.

The computer mount advantageously allows the laptop computer to be stored and operated while being carried by a motorcycle. This is accomplished while reducing the chance of the laptop computer being damaged while in transient or while in use.

When the folding arm assembly is in the stored position, the tension device is used to reduce any impact forces that may be subjected to the laptop computer when the motorcycle is traveling over rough road conditions. In addition, the at least one strap insures that the folding arm assembly, support tray and laptop computer remain in the stored position within the storage box while in transient.

When the folding arm assembly is in the extended position, it may be 3-dimensionally positioned so that the user can comfortably operate the laptop computer. In other words, the laptop computer can be positioned by the police officer to accommodate road surface conditions and for entering data without having to worry about the laptop computer falling to the ground. In addition, the adjustable support tray is used to secure the laptop computer so that the computer does not inadvertently fall to the ground when the folding arm assembly is in the extended position.

Another aspect of the present invention is directed to a storage box for a motorcycle comprising a housing to be carried by the motorcycle and having an opening therein, and a cover hinged to the housing for enclosing the opening. A computer mount as described above may be mounted within the opening of the housing.

Yet another aspect of the present invention is directed to a method for mounting a computer to a motorcycle using a computer mount comprising a folding arm assembly coupled to a storage box carried by the motorcycle, and a support tray coupled to the folding arm assembly for supporting the computer. The method may comprise securing the computer to the support tray, and moving the folding arm assembly between a stored position for storing the computer within the storage box, and an extended position for extending the computer away from the storage box.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
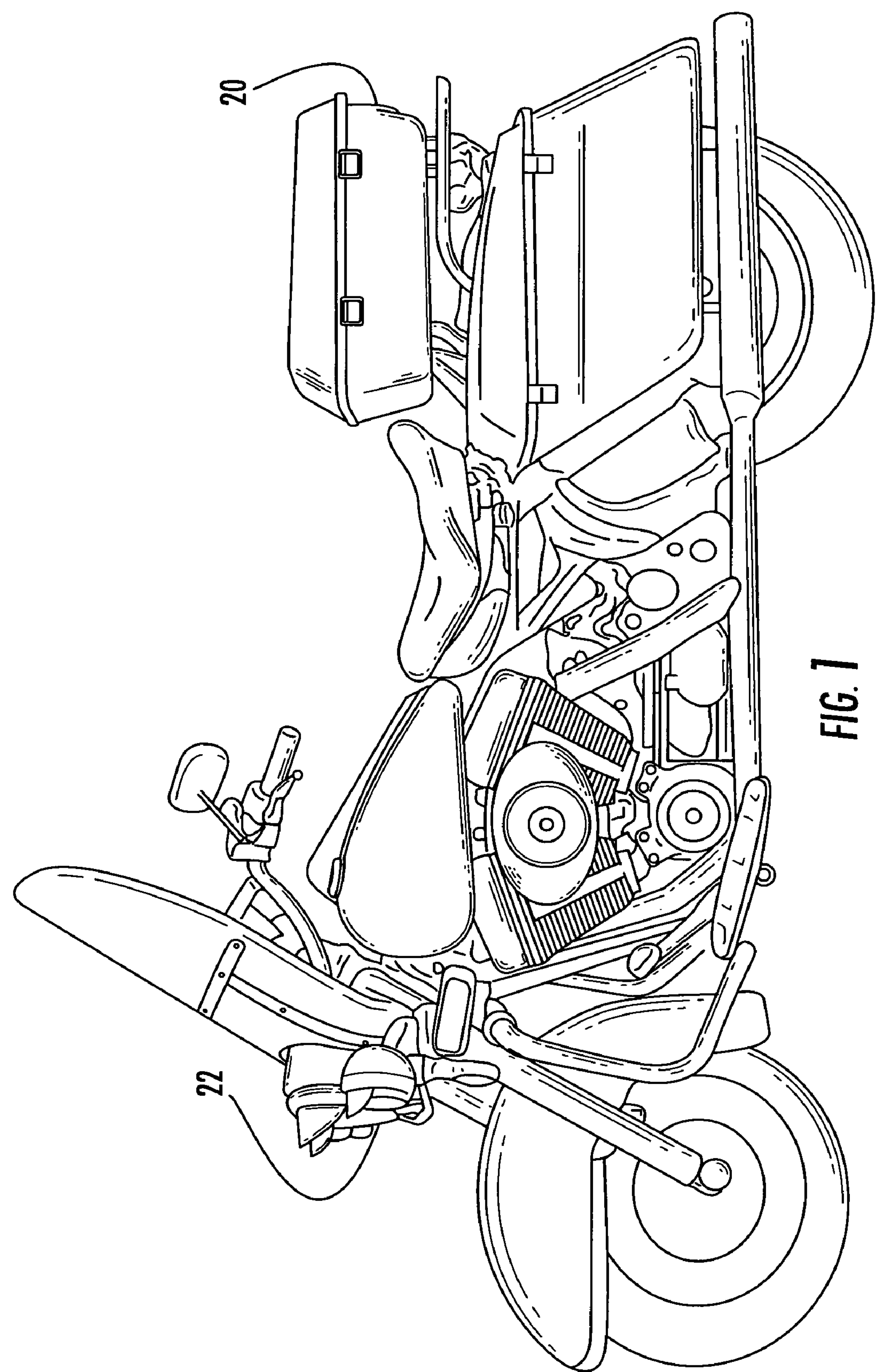
FIG. 1 is a side view of a police motorcycle with a storage box attached thereto in accordance with the present invention.
Figure 2:
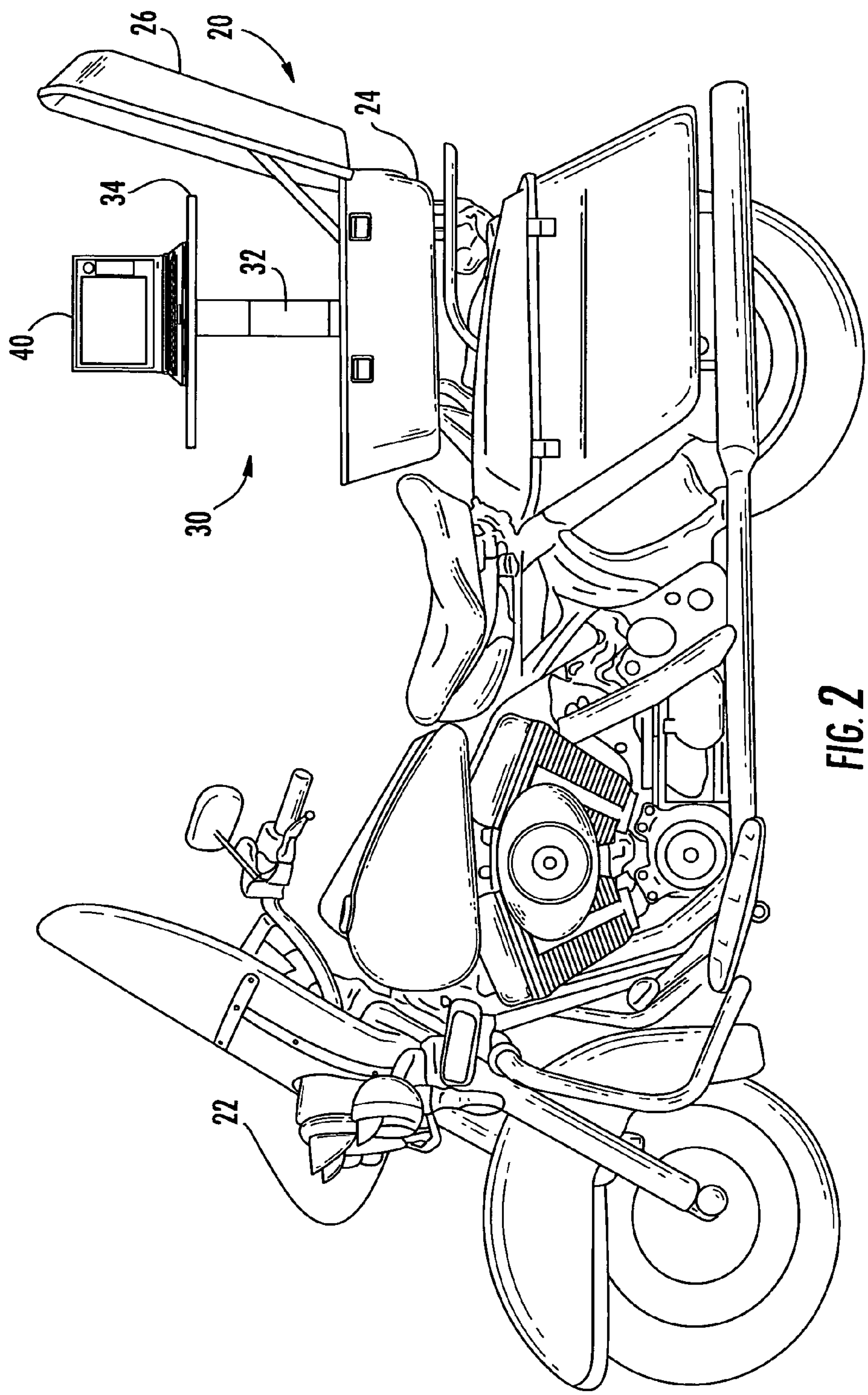
FIG. 2 is side view of the police motorcycle shown in FIG. 1 with the storage box opened and a computer mount mounted therein being in an extended position while holding a laptop computer.

Referring initially to FIGS. 1 and 2, a storage box 20 is carried by a police motorcycle 22 and has a computer mount 30 secured therein for carrying a computer 40, such as a laptop computer. The storage box 20 includes a housing 24 carried by the motorcycle 22, and has an opening therein. A cover 26 is hinged to the housing 24 for enclosing the opening. The computer mount 30 is mounted within the opening of the housing 24.

Even though a police motorcycle 22 is illustrated, the computer mount 20 may be used on non-police motorcycles. In fact, the computer mount 20 is not limited to 2-wheel vehicles. It may be used on 3-wheel and 4-wheel vehicles, for example. As long as a storage box 20 is carried by a vehicle, the computer mount 20 may be used for holding a computer 40 therein. Along the same lines, the computer 40 is not limited to a standard office-type computer. The computer 40 also refers to any type of portable processing unit to be carried and used out in the field, as readily appreciated by those skilled in the art.

The computer mount 30 comprises a folding arm assembly 32, and a support tray 34 coupled to the folding arm assembly for supporting the laptop computer 40. The folding arm assembly 32 has a stored position for storing the computer within the storage box 10 (FIG. 1), and an extended position for extending the computer 14 away from the storage box (FIG. 2).

Figure 3:
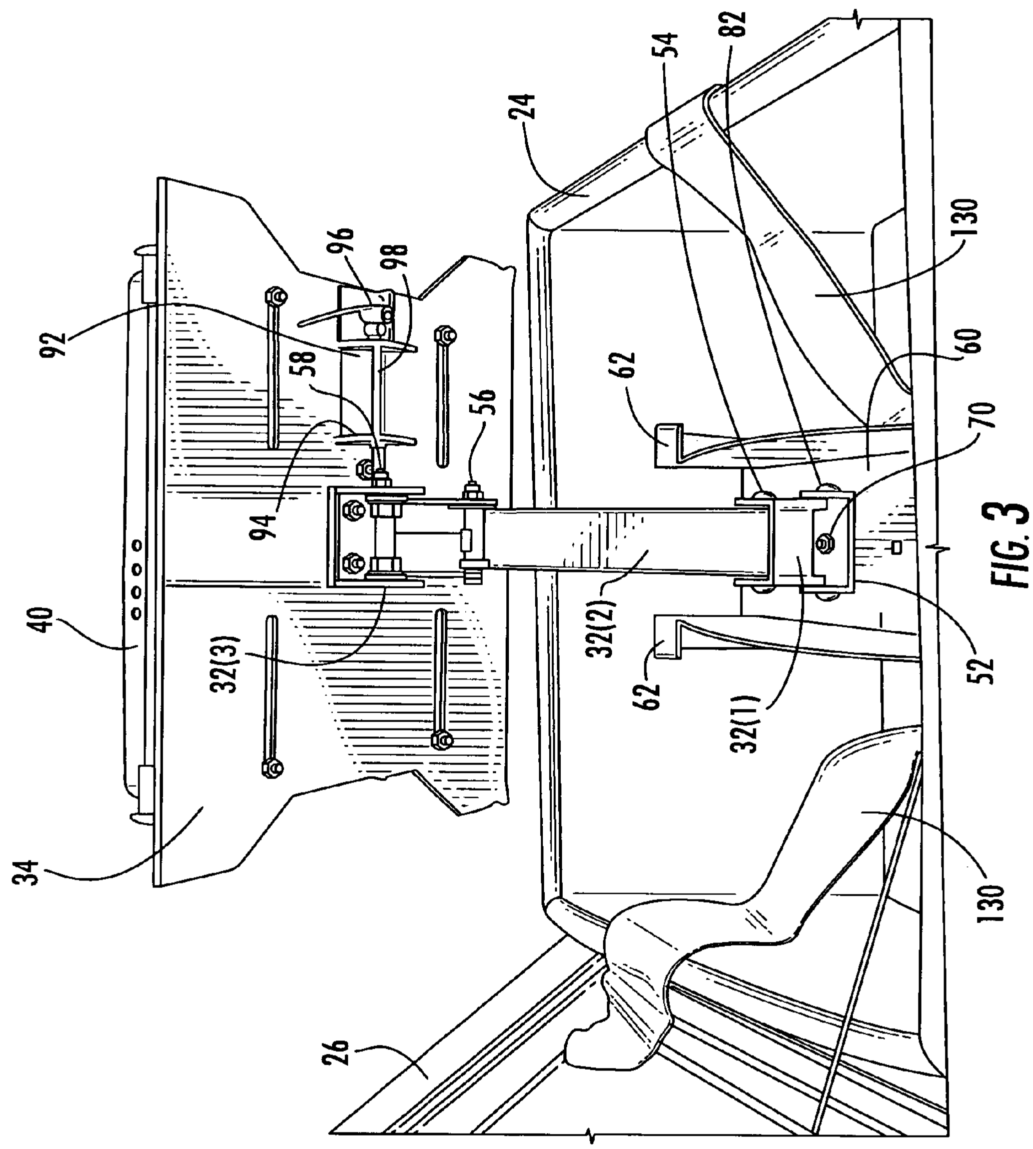
FIG. 3 is a front perspective view of the folding arm assembly in an extended position while holding a laptop computer in accordance with the present invention.
Figure 4:
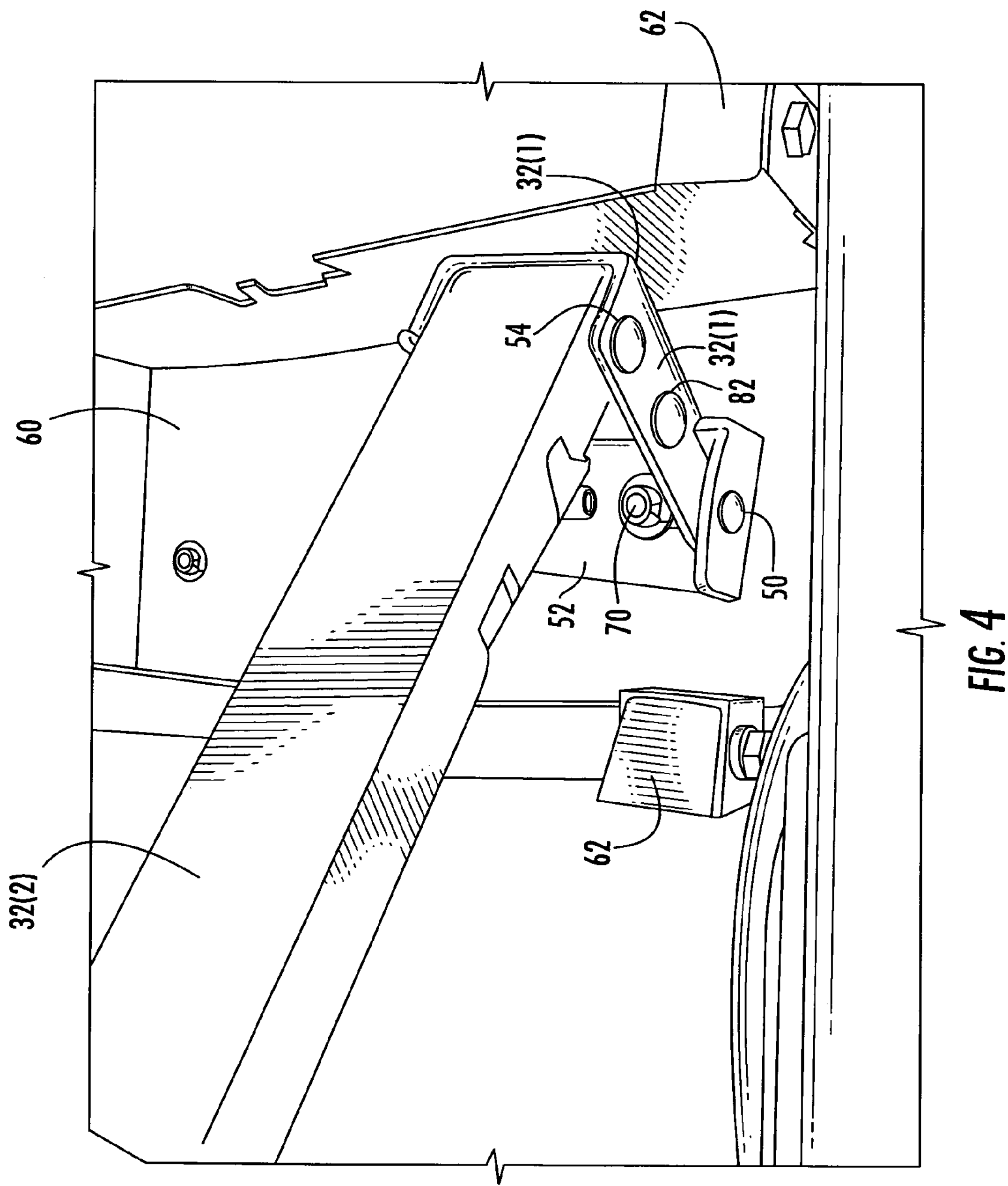
FIG. 4 is a close-up side perspective view of the first and second arms shown in FIG. 3 along with a portion of the resting shelf.
Figure 5:
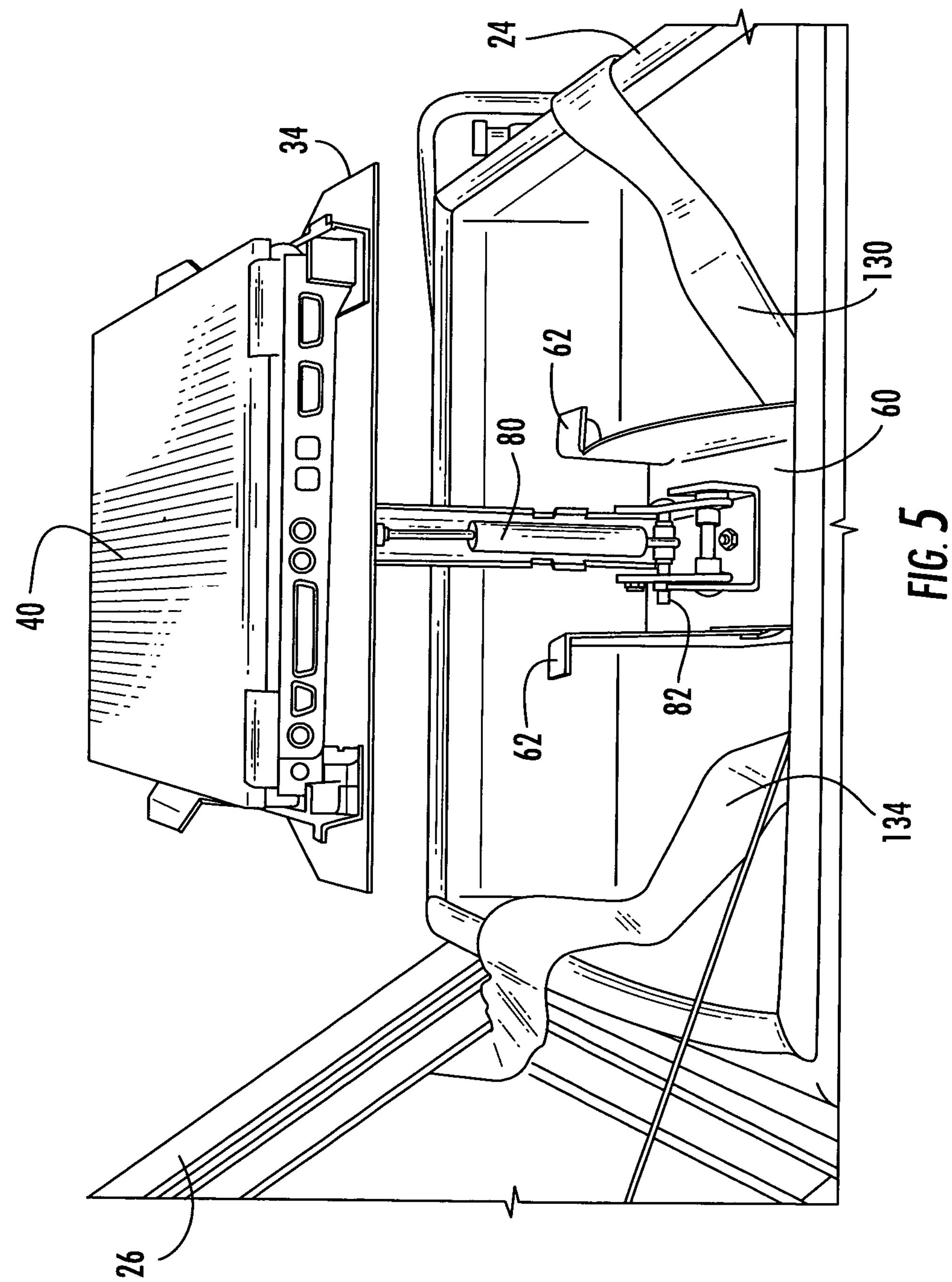
FIG. 5 is a back perspective view of the folding arm assembly in an extended position while holding a laptop computer in accordance with the present invention.

Referring now to FIGS. 3, 4 and 5, the folding arm assembly 32 comprises a plurality of arms 32(1)-32(3). In the illustrated embodiment, a first arm 32(1), a second arm 32(2) and a third arm 32(3) are pivotly coupled together. The support tray 34 is coupled to the third arm 32(3) for supporting the laptop computer 40.

The spacing between the sidewalls of the second arm 32(2) is less than the spacing between the sidewalls of the first arm 32(1). Likewise, the spacing between the sidewalls of the second arm 32(2) is less than the spacing between the sidewalls of the third arm 32(3). This advantageously allows the folding arm assembly 32 to have a low profile when in the stored position.

One end of the first arm 32(1) is pivotly coupled via a pair of bolts 50 to a mounting plate 52. In lieu of the pair of bolts 50, a single bolt may be used. The mounting plate 52 may be mounted directly to the storage box 20 or to the illustrated resting shelf 60. The resting shelf 60 provides a rest stop on surfaces 62 and 64 when the folding arm assembly 32 is in the stored position.

The other end of the first arm 32(1) is pivotly coupled to the second arm 32(2) via a bolt 54. The other end of the second arm 32(2) is pivotly coupled to the third arm 32(3) via a bolt 56. Likewise, the other end of the third arm 32(3) is pivotly coupled to the support tray 34 via a bolt 58. Since the arms 32(1)-32(3) are pivotly coupled together, the laptop computer 40 can be moved in an up/down direction as well as a forward/backward direction. This advantageously allows the support tray 34 to be placed in a desired vertical orientation so that the user can comfortably operate the laptop computer 40.

The mounting plate 34 is also pivotly mounted to the resting shelf 60 via a bolt 70, and as a result, the folding arm assembly 32 can be rotated in a left/right direction. In other words, the mounting plate 52 can be rotated a full 360 degrees in a direction parallel to the ground. This advantageously allows the support tray 34 to be placed in a desired horizontal orientation so that the user can comfortably operate the laptop computer 40

To hold the folding arm assembly 32 in the desired vertical orientation, a tension device 80 is coupled between the first arm 32(1) and the second arm 32(2). The tension device 80 may be a spring, a spring shock or a gas shock, for example. The tension device 80 also helps to reduce the amount of shock that may be impacted on the laptop computer 40 when stored away in the storage box 20 while the motorcycle 22 is moving.

One end of the tension device 80 is held in place by a bolt 82 extending through the first arm 32(1). Alternatively, the bolt 54 used to pivotly couple the first and second arms 32(1) and 32(2) together may be used. The other end of the tension device 80 is held in place by the same bolt 56 used to pivotly couple the second and third arms 32(2) and 32(3) together. Alternatively, the other end of the tension device 80 may be attached to the second or third arm 32(2), 32(3) with a separate bolt. Although not illustrated, a tension device may also extend between the second arm 32(2) and the third arm 32(3).

Figure 6:
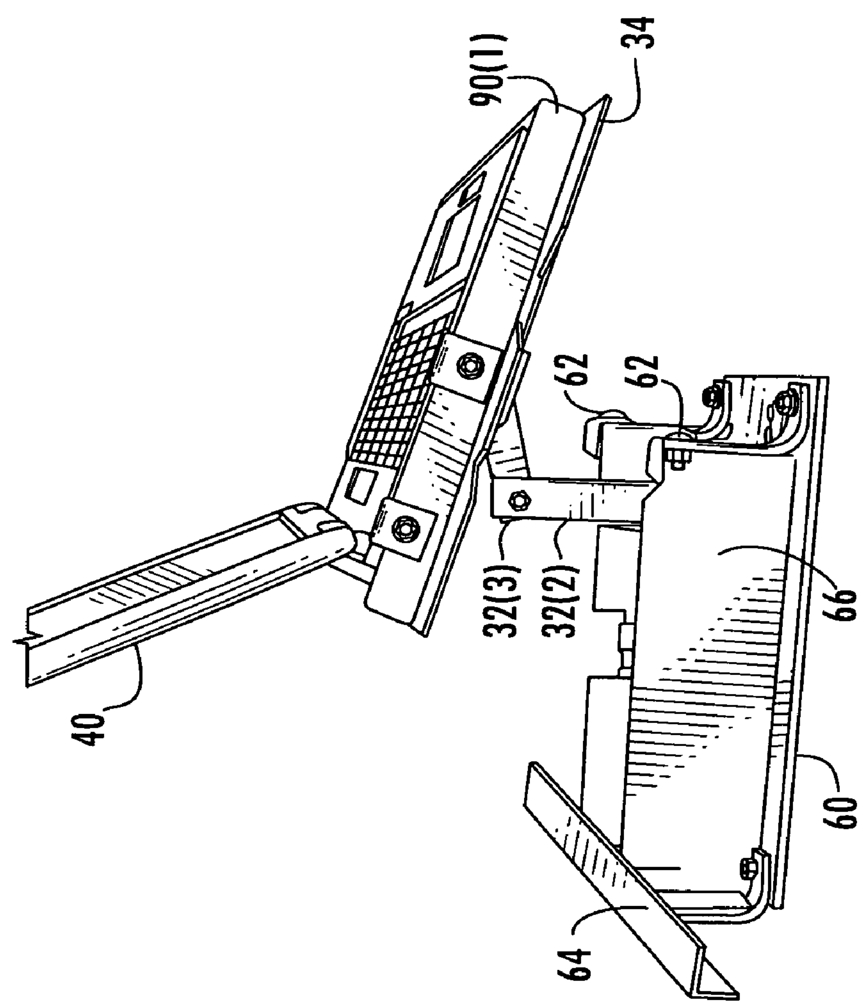
FIG. 6 is a side perspective view of the computer mount removed from the storage box with the folding arm assembly in an extended position while holding a laptop computer in accordance with the present invention.

The resting shelf 60, as shown in FIG. 6, along with the folding arm assembly 32 and the laptop computer 40, are removed from the storage box 20 to better illustrate the resting shelf. When the folding arm assembly 32 is in the stored position, the underside of the support tray 34 contacts the rest stops 62 and 64. Rest stop 64 is a bar that extends outwardly from the sidewalls 66 of the resting shelf 60. The resting shelf 60 advantageously maintains a storage area under the support tray 34 within the storage box 20 when the folding arm assembly 32 is in the stored position. The height of the sidewalls 66 depends on the height of the storage box 20 and on the compactness of the folding arm assembly 32, and may vary between 3 to 10 inches, for example.

The resting shelf 60 may be made out of aluminum, for example. Likewise, the folding arm assembly 32 and support tray 34 may also be made out of aluminum. In lieu of aluminum, other material may be used, such as fiberglass, plastic or other types of metals.

Figure 7:
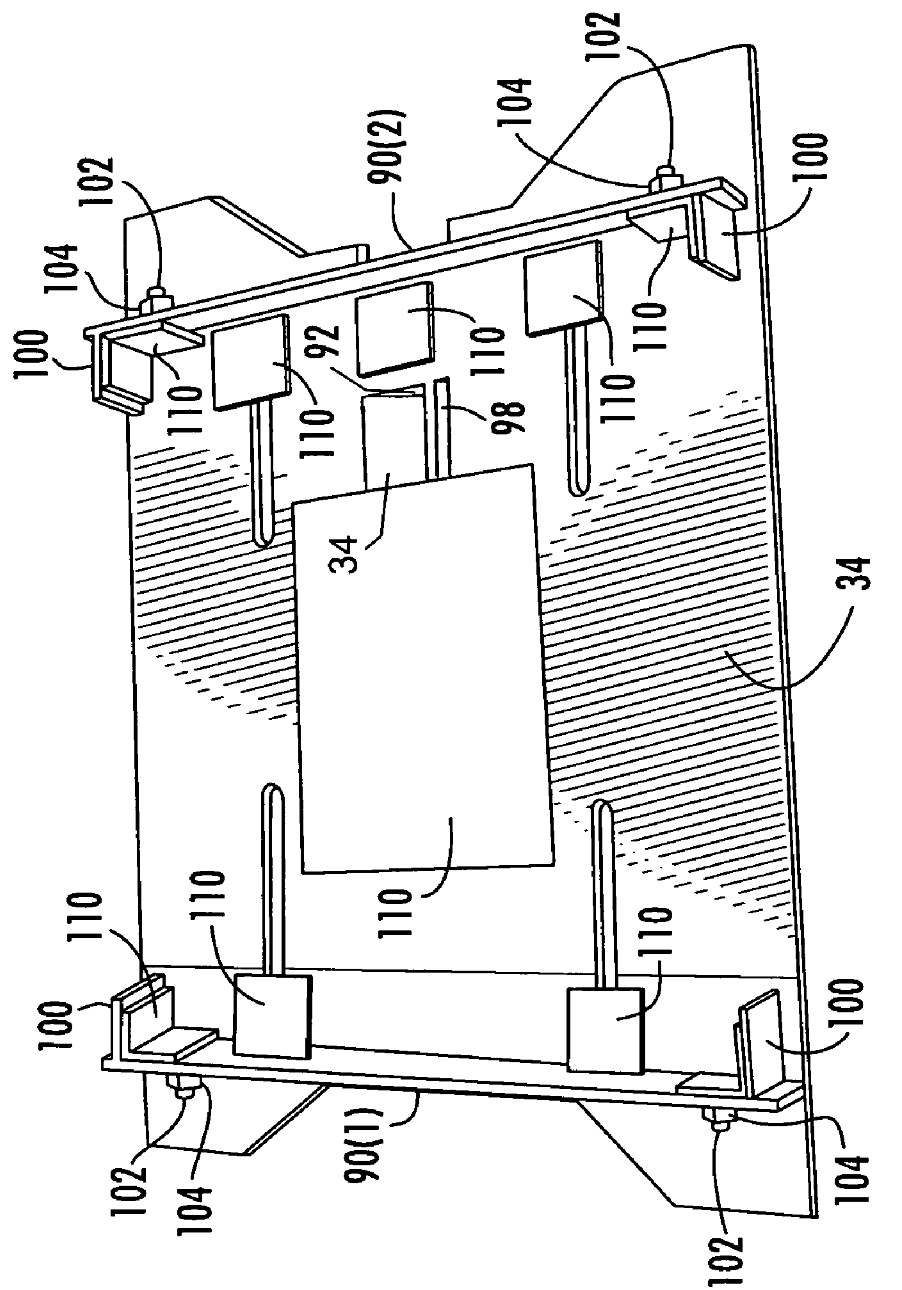
FIG. 7 is a top perspective view of the support tray with the laptop computer removed therefrom in accordance with the present invention.

Referring now to FIG. 7, the support tray 34 includes several adjustment features for adjusting to the size of the laptop computer 40. A pair of spaced apart side rails 90(1), 90(2) is coupled to the support tray 34 for holding the computer 40 in place. At least one of the side rails 90(2) is adjustable for adjusting to the length/width of the computer 40. A portion 92 of the adjustable side rail 90(2) extends through an opening in the support tray 34. Referring back to FIG. 3, spaced apart from this portion 92 of the adjustable side rail 90(2) is a fixed extension 94.

A handle 96 as best shown in FIG. 3 is attached to a bolt 98 that extends through the portion 92 of the adjustable rail 90(2) and the fixed extension 94. With the laptop computer 40 in place, the handle 96 is turned to tighten the adjustable side rail 90(2) against the laptop computer 40. The other side rail 90(1) is fixed.

The support tray 34 further comprises a pair of spaced apart corner stops 100 on each side rail 90(1), 90(2) for respectively contacting corners of the computer 40. At least one corner stop 100 on each side rail 90(1), 90(2) is adjustable for adjusting to the width/length of the computer 40. Each corner stop 100 is held in place by a bolt 102 and nut 104. When the corner stops 100 are in a desired position, the respective nuts 104 are tightened. To prevent the laptop computer 40 from being scratched, a plurality of pads 110 are attached to the support tray 34, the side rails 90(1), 90(2) and the corner stops 100.

Figure 8:
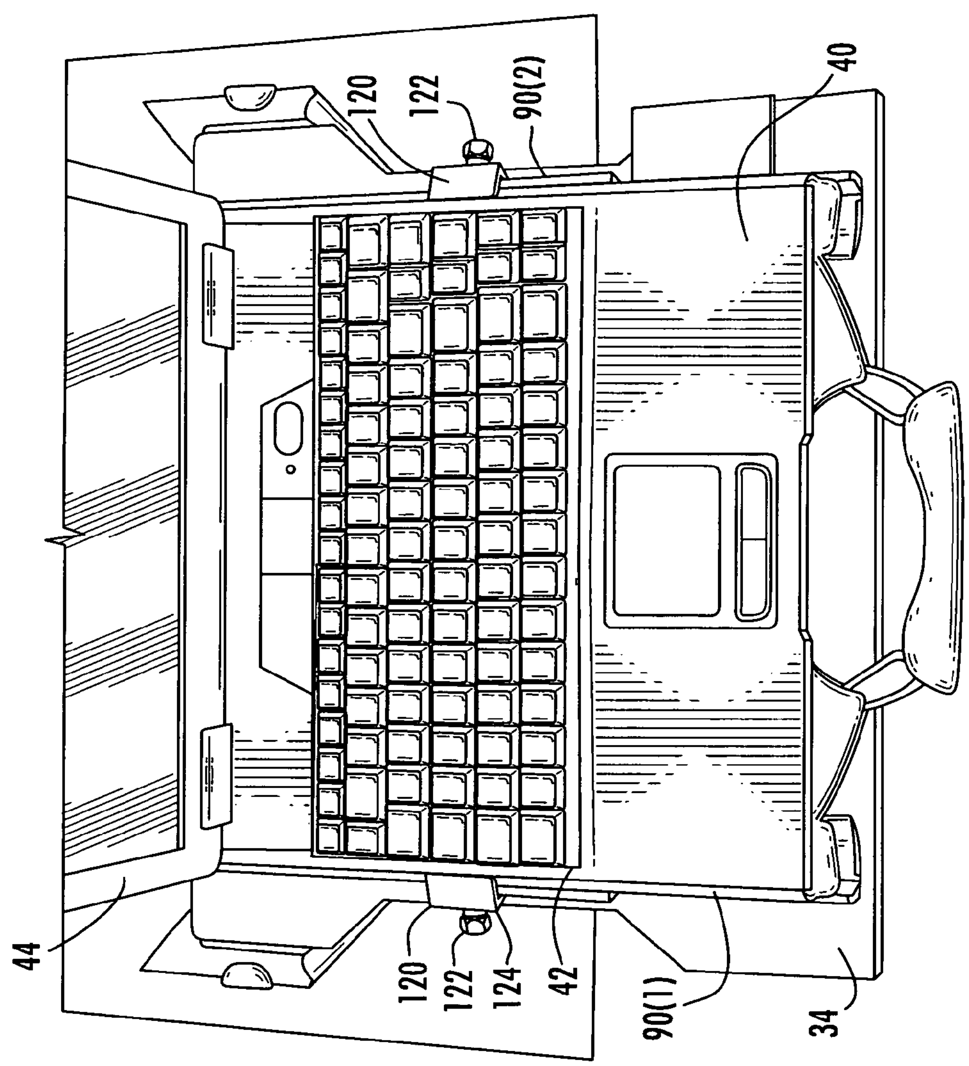
FIG. 8 is a top perspective view of the support tray with the laptop computer being held in place by a pair of L-shaped side clamps in accordance with the present invention.
Figure 9:
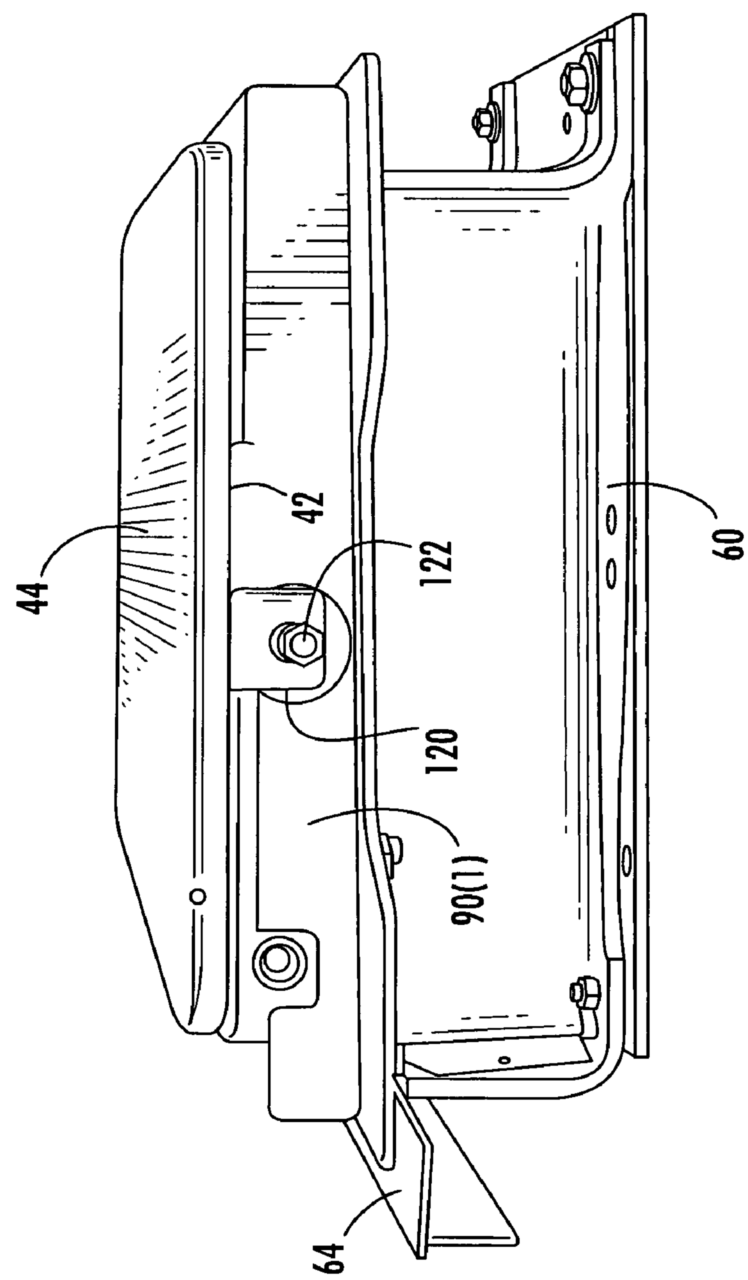
FIG. 9 is a side perspective view of the computer mount removed from the storage box with the folding arm assembly in a stored position while holding a laptop computer in accordance with the present invention.

Another adjustment feature for securing the laptop computer 40 to the support tray 34 is a pair of L-shaped side claims 120, as best shown in FIGS. 8 and 9. Each L-shaped side clamp 120 has an elongated opening in which the side clamp can be positioned above the side edge 42 of the laptop computer 40 with the monitor 44 in an open position. A bolt 122 is inserted through the elongated opening and a corresponding opening in the side rail 90(1), 90(2). A fixed nut on the backside of the openings is tightened toward the corresponding bolt 122. A spring 124 may be placed between the bolt 122 and the side clamp 120 to hold it in place.

Figure 10:
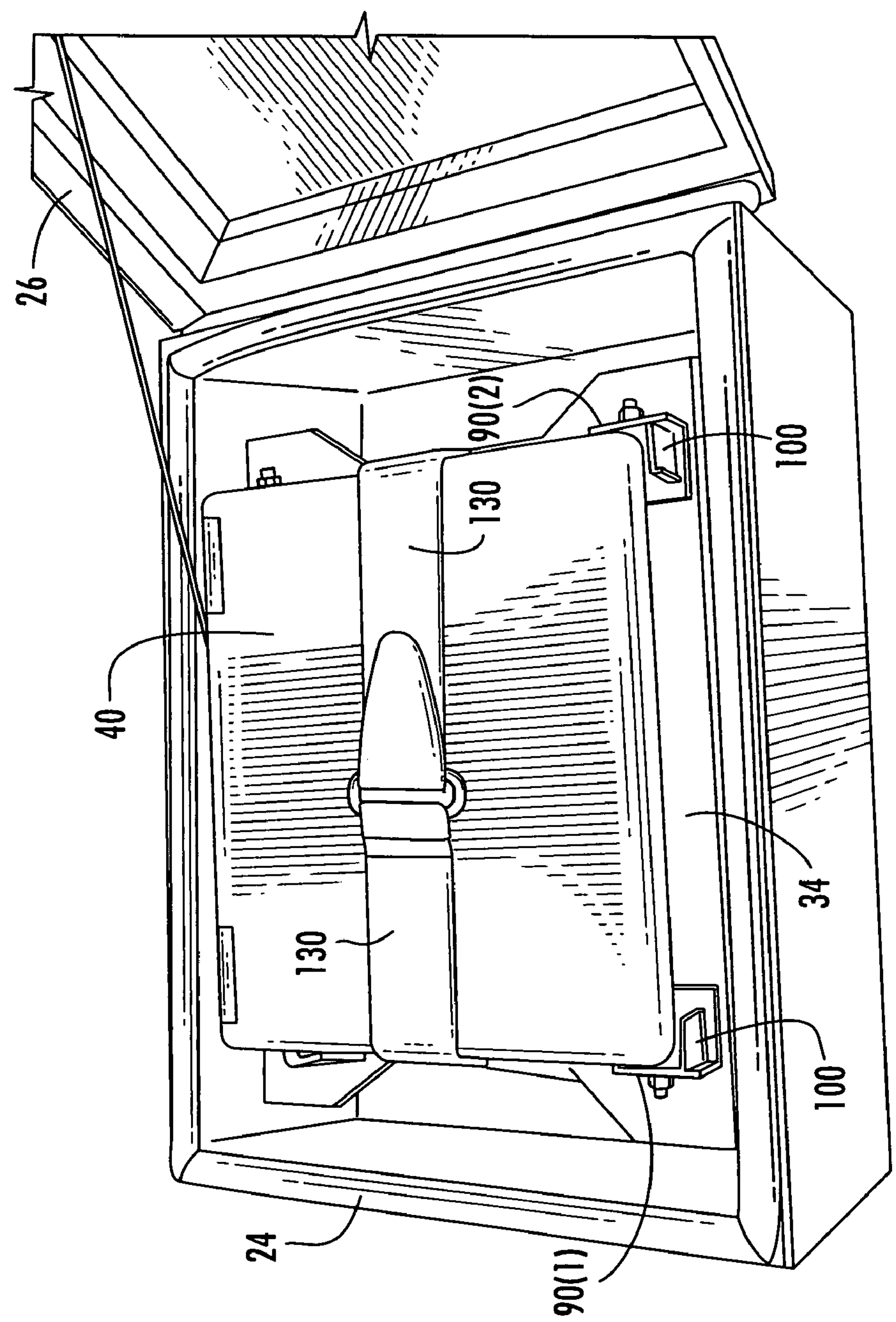
FIG. 10 is a top perspective view of the laptop computer secured by straps within the storage box in accordance with the present invention.

In addition, the computer mount 30 also includes fastening straps 130 for securing the laptop computer 40 in place when stored in the storage box 20, as illustrated in FIG. 10. The fastening straps 130 may comprise hook-and-loop fasteners, such as velcro, for example.

Another aspect of the invention is directed to a method for mounting a computer 40 to a motorcycle 22 using a computer mount 30 comprising a folding arm assembly 32 coupled to a storage box 20 carried by the motorcycle, and a support tray 34 coupled to the folding arm assembly for supporting the computer. The method comprises securing the computer 40 to the support tray 34, and moving the folding arm assembly 32 between a stored position for storing the computer within the storage box 20, and an extended position for extending the computer away from the storage box.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

The invention claimed is:

1. A computer mount for a storage box carried by a motorcycle comprising:
- a folding arm assembly coupled to the storage box;
- a support tray coupled to said folding arm assembly for supporting a computer;
- said folding arm assembly having a stored position for storing the computer within the storage box, and an extended position for extending the computer away from the storage box;
- at least one gas shock coupled to said folding arm assembly for holding in the extended position; and
- a resting shelf coupled to the storage box and adjacent said folding arm assembly, and comprising
  - spaced apart sidewalls for defining a storage area therebetween when said folding arm assembly is in the stored position, and
  - spaced apart rest stops carried by said spaced apart sidewalls for contacting said support tray when said folding arm assembly is in the stored position.

2. A computer mount according to claim 1
- wherein said folding arm assembly comprises a plurality of arms pivotly coupled together; and wherein said support tray is pivotly coupled to said folding arm assembly.

3. A computer mount according to claim 2 wherein said plurality of arms comprises:
- a first arm pivotly coupled to the storage box;
- a second arm pivotly coupled to said first arm; and
- a third arm pivotly coupled to said second arm.

4. A computer mount according to claim 1 wherein said folding arm assembly can be 3-dimensionally positioned.

5. A computer mount according to claim 1 further comprising a rotatable mount coupled between said folding arm assembly and the storage box so that said folding arm assembly is rotatable 360 degrees in a direction parallel to the ground.

6. A computer mount according to claim 1 wherein said support tray comprises an adjustable support tray for adjusting to a size of the computer.

7. A computer mount according to claim 6 wherein said adjustable support tray comprises a pair of spaced apart side rails, and at least one of said side rails being adjustable for adjusting to a length of the computer.

8. A computer mount according to claim 7 wherein said adjustable support tray further comprises a pair of spaced apart corner stops on each side rail for respectively contacting corners of the computer, and at least one corner stop on each side rail being adjustable for adjusting to a width of the computer.

9. A computer mount according to claim 7 wherein said adjustable support tray further comprises at least one L-shaped side clamp on each side rail, each L-shaped side clamp being adjustable for adjusting to a height of the computer.

10. A computer mount according to claim 1 further comprising at least one strap coupled between said resting shelf and the computer for maintaining contact between said support tray and said plurality of rest stops when said folding arm assembly is in the stored position.

11. A storage box for a motorcycle comprising:

a housing to be carried by the motorcycle and having an opening therein;

a cover hinged to said housing for enclosing the opening; and a computer mount within the opening of said housing and comprising a folding arm assembly coupled to said housing and having a stored position for storing a computer within said housing, and an extended position for extending the computer away from said housing, at least one shock coupled to said folding arm assembly for holding in the extended position, a support tray coupled to said folding arm assembly for supporting the computer, and a resting shelf coupled to said housing and adjacent said folding arm assembly, and comprising spaced apart sidewalls for defining a storage area therebetween when said folding arm assembly is in the stored position.

12. A storage box according to claim 11 wherein said folding arm assembly comprises a plurality of arms pivotly coupled together; and wherein said support tray is pivotly coupled to said folding arm assembly.

13. A storage box according to claim 12 wherein said plurality of arms comprises:

a first arm pivotly coupled to the storage box;

a second arm pivotly coupled to said first arm; and a third arm pivotly coupled to said second arm.

14. A storage box according to claim 11 wherein said folding arm assembly can be 3-dimensionally positioned.

15. A storage box according to claim 11 further comprising a rotatable mount coupled between said folding arm assembly and said housing so that said folding arm assembly is rotatable 360 degrees in a direction parallel to the ground.

16. A storage box according to claim 11 wherein said support tray comprises an adjustable support tray for adjusting to a size of the computer.

17. A storage box according to claim 16 wherein said adjustable support tray comprises a pair of spaced apart side rails, and at least one of said side rails being adjustable for adjusting to a length of the computer.

18. A storage box according to claim 17 wherein said adjustable support tray further comprises a pair of spaced apart corner stops on each side rail for respectively contacting corners of the computer, and at least one corner stop on each side rail being adjustable for adjusting to a width of the computer.

19. A storage box according to claim 17 wherein said adjustable support tray further comprises at least one L-shaped side clamp on each side rail, each L-shaped side clamp being adjustable for adjusting to a height of the computer.

20. A storage box according to claim 11 wherein said resting shelf further comprises spaced apart rest stops carried by said spaced apart sidewalls for contacting said support tray when said folding arm assembly is in the stored position.

21. A storage box according to claim 20 wherein said computer mount further comprises at least one strap coupled between said resting shelf and the computer for maintaining contact between said support tray and said plurality of rest stops when said folding arm assembly is in the stored position.

22. A method for operating a computer mount for a motorcycle, the computer mount comprising a folding arm assembly coupled to a storage box carried by the motorcycle, at least one shock coupled to the folding arm assembly, a support tray coupled to the folding arm assembly for supporting a computer, and a resting shelf coupled to the storage box and adjacent the folding arm assembly, the resting shelf comprising spaced apart sidewalls for defining a storage area therebetween, the method comprising:

securing the computer to the support tray; and moving the folding arm assembly between a stored position and an extended position so that the folding arm assembly is within the storage area defined between the spaced apart sidewalls of the resting shelf when in the stored position, and the folding arm assembly extends the computer away from the storage box when in the extended position, with the at least one shock holding the folding arm assembly in the extended position.

23. A method according to claim 22 wherein the folding arm assembly comprises a plurality of arms pivotly coupled together; and wherein the support tray is pivotly coupled to the folding arm assembly.

24. A method according to claim 22 wherein the folding arm assembly can be 3-dimensionally positioned.

25. A method according to claim 22 wherein the support tray comprises an adjustable support tray for adjusting to a size of the computer.

26. A method according to claim 25 wherein the adjustable support tray comprises a pair of spaced apart side rails, and at least one of the side rails being adjustable for adjusting to a length of the computer.

27. A method according to claim 22 wherein the resting shelf further comprises spaced apart rest stops carried by said spaced apart sidewalls for contacting the support tray when the folding arm assembly is in the stored position; and at least one strap coupled between the resting shelf and the computer for maintaining contact between the support tray and the spaced apart rest stops when the folding arm assembly is in the stored position.

* * * * *